(No Model.) 5 Sheets—Sheet 1.
C. A. GREEN.
MACHINE FOR PREPARING FIBER.
No. 539,262. Patented May 14, 1895.
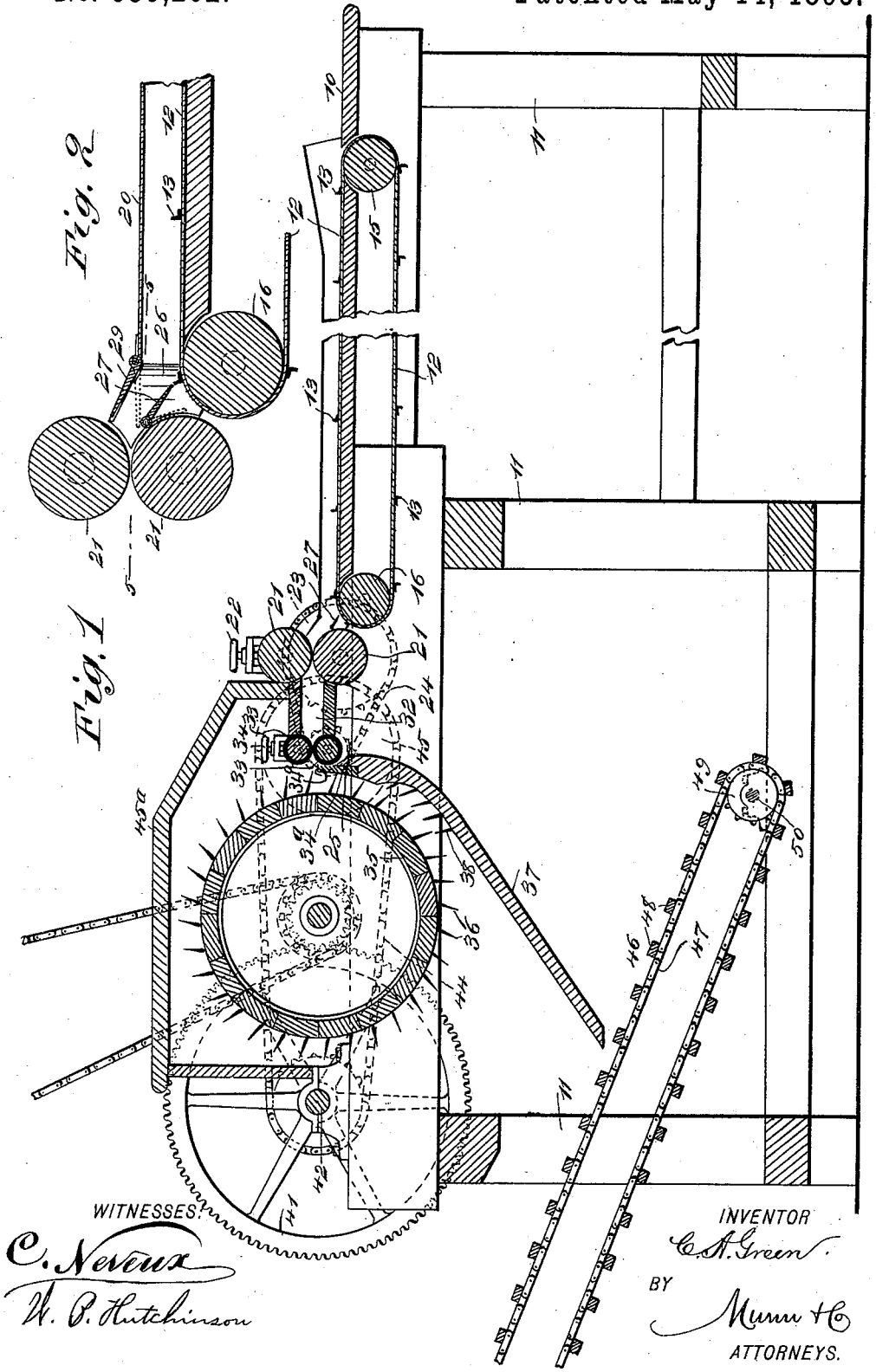
WITNESSES:
C. Neveux
W. P. Hutchinson
INVENTOR
C. A. Green
BY
Munn & Co
ATTORNEYS.

(No Model.) 5 Sheets—Sheet 2.
C. A. GREEN.
MACHINE FOR PREPARING FIBER.
No. 539,262. Patented May 14, 1895.
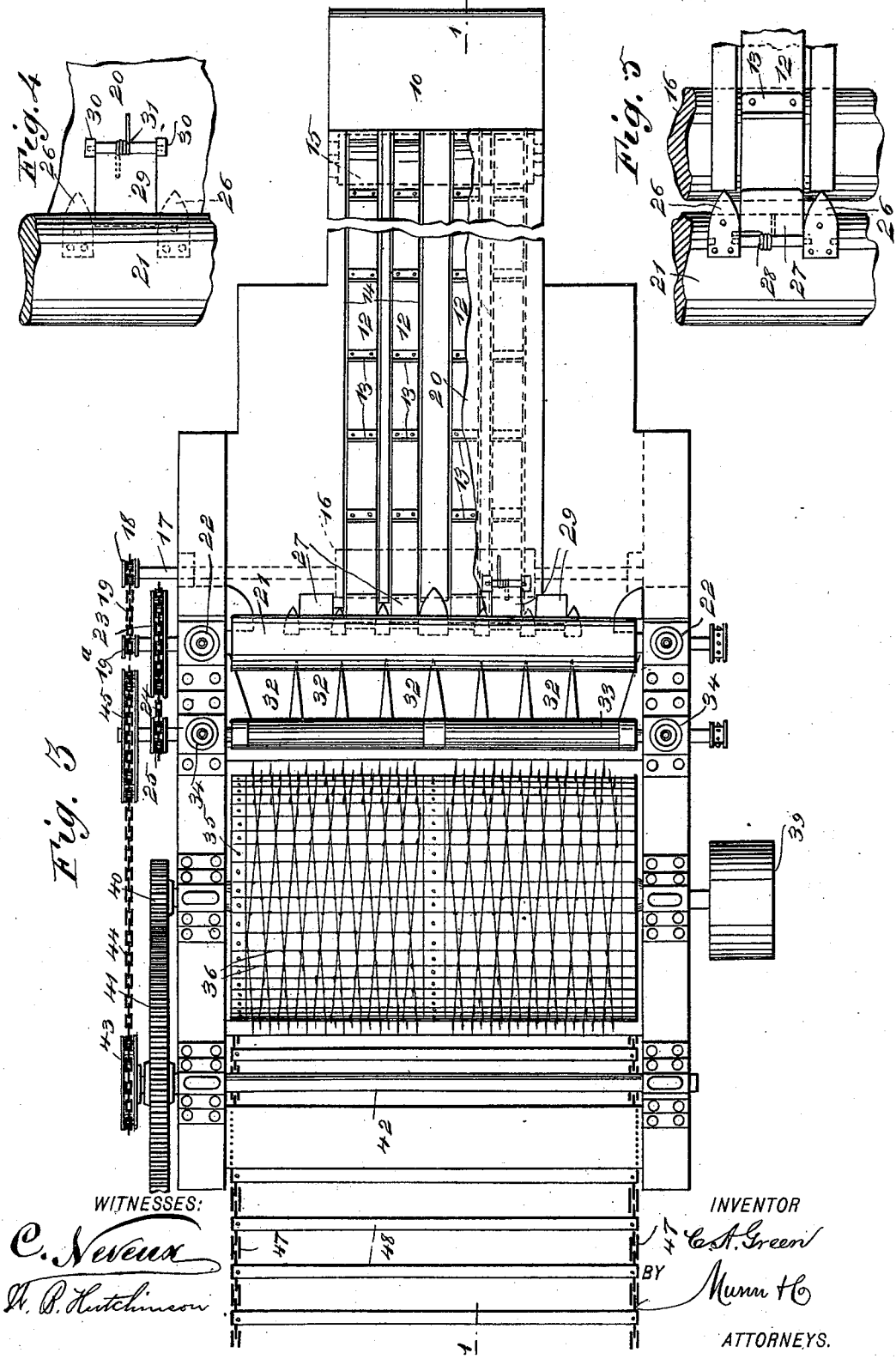
WITNESSES:
C. Neveux
W. B. Hutchinson
INVENTOR
C. A. Green
BY
Munn & Co
ATTORNEYS.

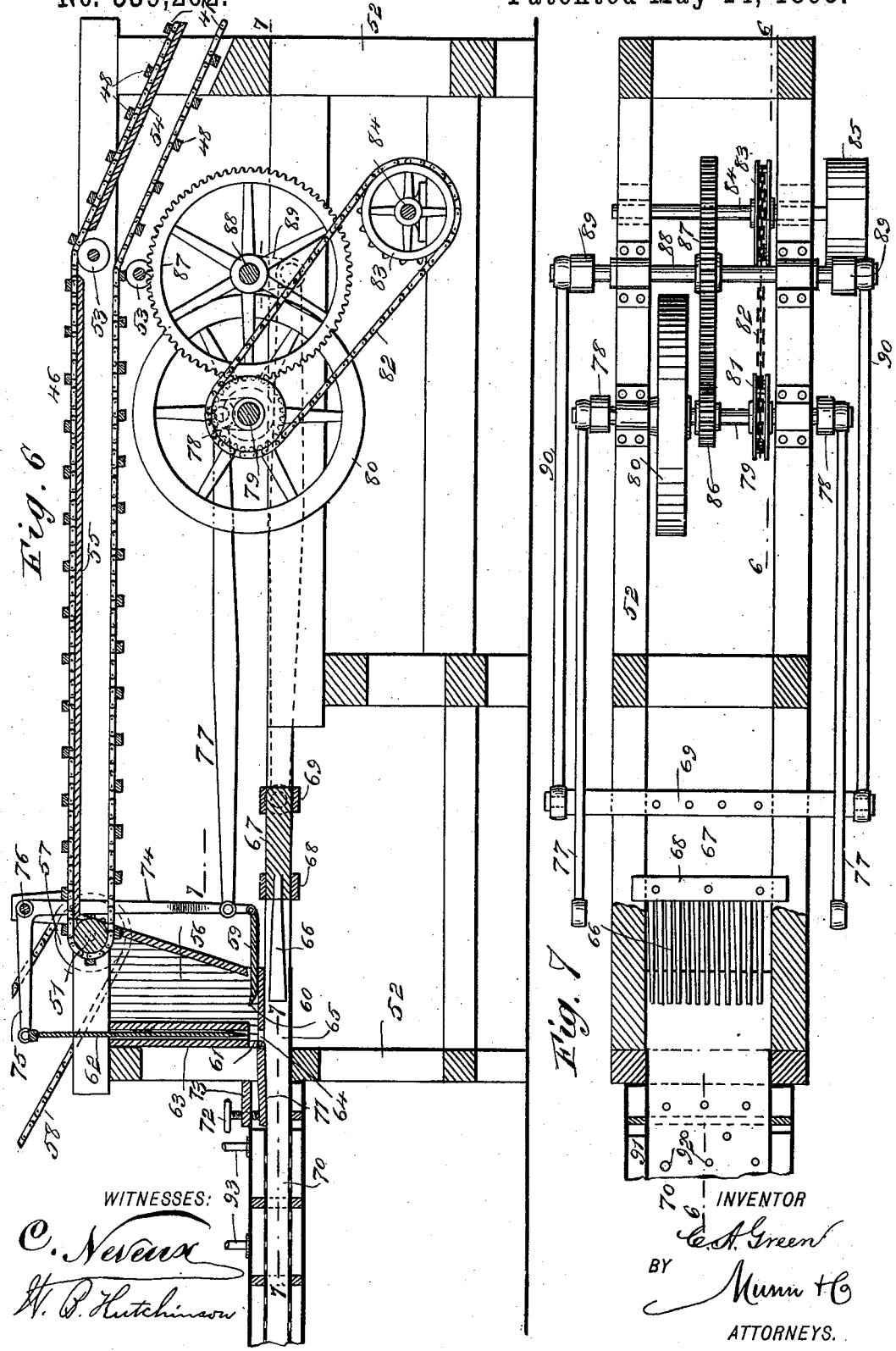

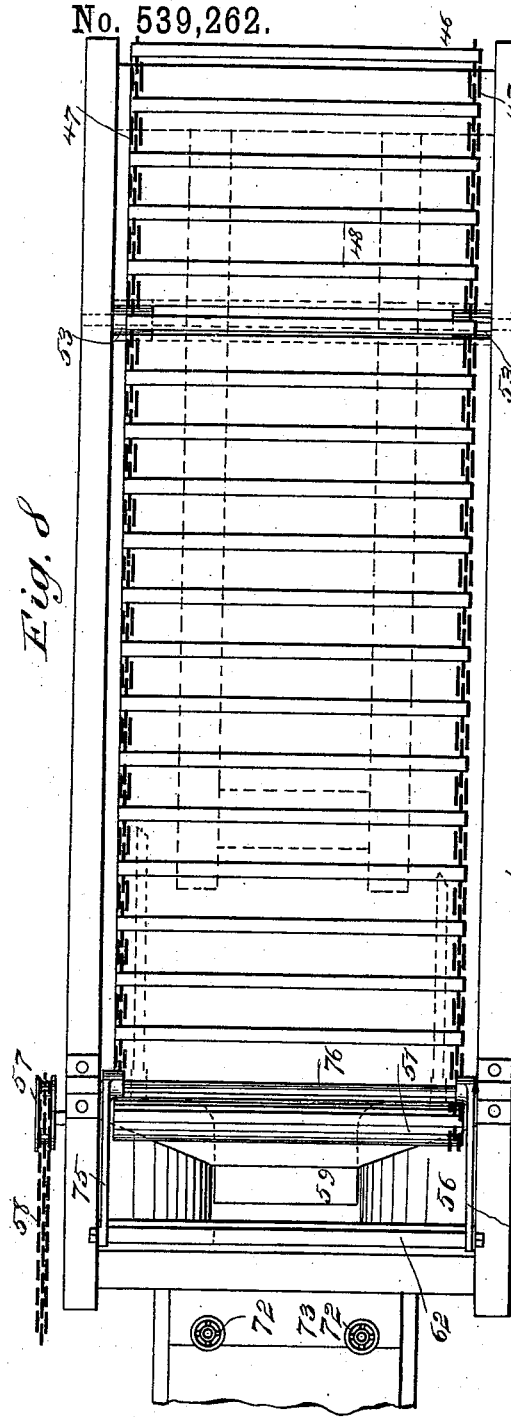
(No Model.) C. A. GREEN. MACHINE FOR PREPARING FIBER.
No. 539,262. Patented May 14, 1895.
5 Sheets—Sheet 4.

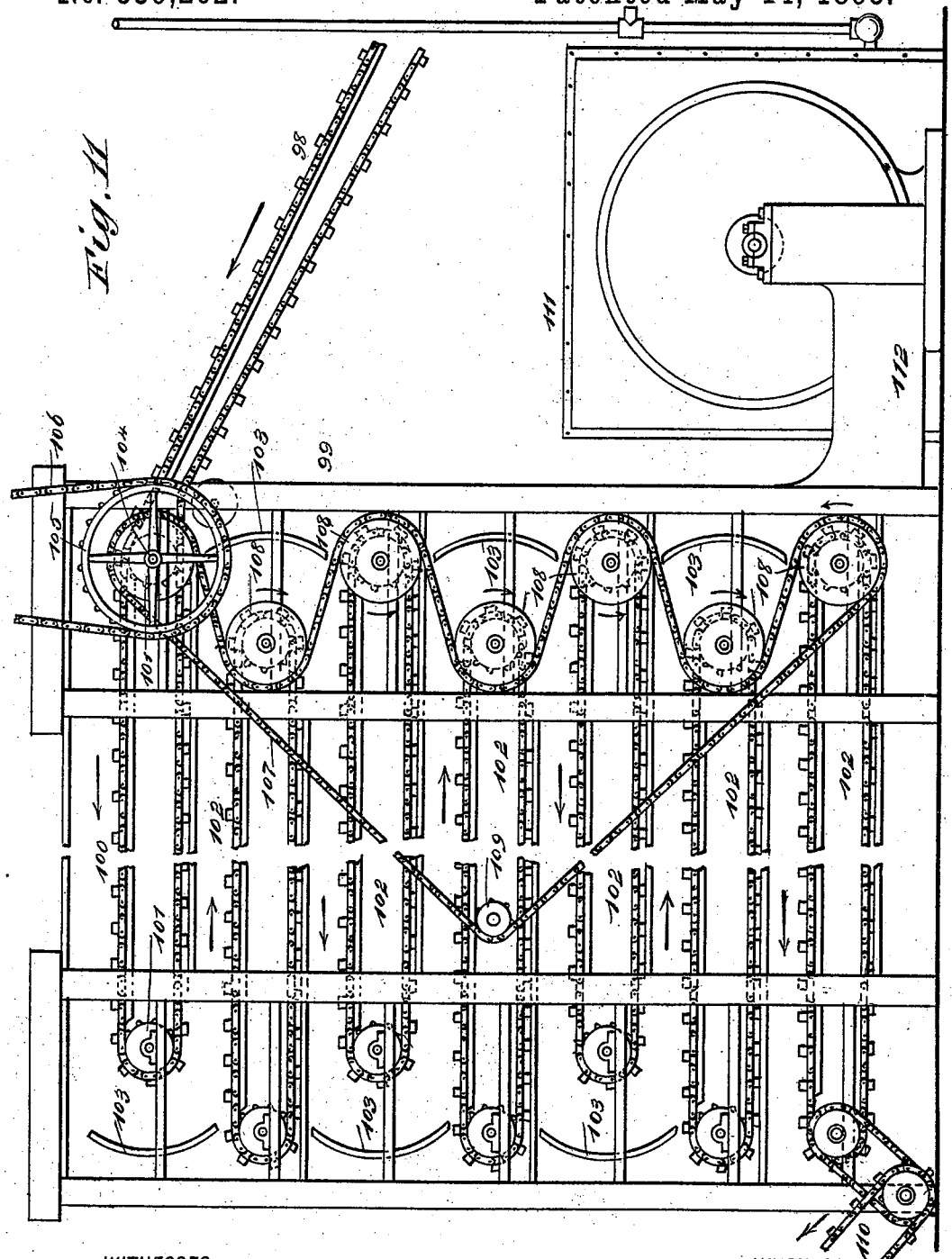

UNITED STATES PATENT OFFICE.

CHARLES A. GREEN, OF JACKSONVILLE, FLORIDA, ASSIGNOR TO HIMSELF AND EUGENE C. DEARBORN, OF SAME PLACE.

MACHINE FOR PREPARING FIBER.

SPECIFICATION forming part of Letters Patent No. 539,562, dated May 14, 1895.

Application filed May 28, 1894. Serial No. 512,630. (No model.)

*To all whom it may concern:*

Be it known that I, CHARLES A. GREEN, of Jacksonville, in the county of Duval and State of Florida, have invented a new and Improved Machine for Preparing Fiber, of which the following is a full, clear, and exact description.

My invention relates to improvements in that class of machines which are used for converting leaves, stems and other fibrous things, particularly the leaves and stems of palmetto and palm trees, into commercial fiber or excelsior; and the object of my invention is to produce a series or continuous process machine of this class into which the crude leaves may be fed and from which they emerge formed into commercial fiber or excelsior, shredded, crimped and ready for use, the refuse material being completely discarded during the process.

A further object of my invention is to construct the machine in a very simple and substantial manner so that while working efficiently it is little likely to get out of repair.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 1 is a central vertical section on the line 1 1 of Fig. 3, showing the shredding and feeding part of the machine. Fig. 2 is an enlarged detail section of the crushing and feeding rolls and the mechanism for guiding the leaves to the rolls. Fig. 3 is a broken plan view of the feeding and shredding portion of the machine. Fig. 4 is an enlarged broken plan view of the upper crushing-roll and one of the guide-plates in connection therewith. Fig. 5 is a broken sectional plan on the line 5 5 of Fig. 2. Fig. 6 is a vertical longitudinal section on the line 6 6 of Fig. 7, showing the crimping and a portion of the steaming mechanism of the machine. Fig. 7 is a sectional plan on the line 7 7 of Fig. 6. Fig. 8 is a plan view of the elevator and crimping-hopper. Fig. 9 is a longitudinal section on the line 9 9 of Fig. 10, showing in detail the arrangement of the steam-box and the manner in which it delivers to the fiber-carrying elevator. Fig. 10 is a broken plan view of the steam-box and a portion of the elevator; and Fig. 11 is a broken side elevation, with parts removed, of the drier.

The machine is provided with a feed table 10, which is supported on a suitable frame 11 and is provided with parallel longitudinal feed belts 12, which are provided with spikes or flanges 13 to cause them to carry forward the material thrust upon them, and the belts run preferably in countersunk recesses 14 in the table top, see Fig. 3, so that only the flanges 13 will project above the said top. The belts 12 are carried by drums 15 and 16 journaled in the frame 11 just below the surface of the table 10, as shown clearly in Fig. 1, and the shaft 17 of the drum 16 is provided with a sprocket wheel 18 which is driven by a chain 19 connecting with a sprocket wheel 19ª on the shaft of one of the crushing rolls, as hereinafter described, but though I have shown and will describe the driving mechanism of the machine, it will be understood that the several rolls, the cylinder or other moving parts may be driven in any approved way without departing from the principle of the invention.

The table 10 is preferably provided with a cover plate 20, arranged to form a space beneath it through which the leaves are fed by the flanges 13 on the aprons 12, and at the end of this space and above the drum 16 and a little behind it are the crushing rolls 21 through which the leaves are fed and between which they are crushed and straightened. The upper crushing roll 21 is mounted in the usual vertically adjustable bearings which are not shown in detail but which are regulated by the hand wheels 22. The lower roll 21 is driven by a sprocket wheel 23 which connects by means of a chain 24 with a sprocket wheel 25 on the shaft of one of the clutch rolls 33 which will be hereinafter referred to.

As the leaves enter the crush rolls they are straightened out by the guides 26 between which they pass, and the guides, as illustrated, are secured to the top plate 20 but may be secured in any convenient way. The guides are thin in front and thicken toward their rear ends, as illustrated in Fig. 3, and they thus serve to straighten out the leaves so that they will pass, in proper shape, to the crush rolls which crush the leaves and stems so that they may be readily shredded, and to further guide the leaves, plates 27 are used which are hung just in front of the lower crush roll and at the ends of the belts 12, these plates being arranged between the guides 26 and held up by suitable springs 28, and when in normal position the leaves shoot up off these plates between the rolls but if the passage to the rolls becomes clogged by trash or for any other reason, the plates spring down under the increased pressure so as to permit the clogging material to pass off the end of the belt. As there is a plate opposite each belt, it will be seen that if one belt becomes momentarily clogged it will not interfere with the feeding of the others.

Above the plates 27 are similar guide plates 29, which are hinged, as shown at 30, to the top plate 20 and extend opposite the upper crushing roll 21, the plates being held up by springs 31, and a passageway is formed between the upper and lower plates 29 and 27 for the passage of the leaves and, if desired, the leaves may be fed to the crushing rolls from above the top plate 20, the plates 29 being depressed so as to permit the leaves to pass in over the tops of them, and thus the machine may be fed from the sides as well as from the front end of the table 10.

The crushed leaves pass from the rolls 21 through passages 32, see Figs. 1 and 3, which hold them straight, and enter between the clutch rolls 33 which are preferably rubber covered, to give them the necessary friction, and the bearings of the upper clutch roll are adjustable by means of the hand wheels 34. These clutch rolls cause the leaves to be evenly fed to the beater or cylinder 35 which is arranged behind the clutch rolls, and the latter prevent the leaves from going too fast and hold them in such a manner that their protruding portions are caught by the teeth 36 of the beater or cylinder and shredded longitudinally. The leaves pass from the clutch rolls over a brake bar 34ª which extends parallel with the rolls between them and the beater or cylinder, the brake serving to protect the rolls and also causing the leaves to be broken down over its edge so as to be shredded and delivered upon the incline 37. The tip ends of the leaves do not all come in contact with the teeth 36 of the beater and would not be shredded if it were not for the teeth 38 which are secured to the incline 37 adjacent to the beater and these stationary teeth catch the unshredded ends of the leaves and complete the shredding operation.

The teeth on the cylinder or beater 35 have a slight forward pitch, as shown in Fig. 1, and the teeth are arranged in a double spiral line around the cylinder, as illustrated in Fig. 3, so that the leaves are certain to be caught and shredded longitudinally without materially breaking the fiber.

It will be seen that if the teeth were arranged in a single spiral line, the leaves might be caught so as to be slued around and, in passing from tooth to tooth, the difficulty would be made worse, whereas in the double spiral arrangement if one tooth tends to skew a leaf the next will tend to set the leaf straight.

The beater or cylinder 35 is provided with a driving pulley 39 which is secured to its shaft, and the shaft is also connected by means of a gear wheel 40 with a gear wheel 41 on a countershaft 42, see Fig. 3, and this shaft carries a sprocket wheel 43 from which extends a chain 44 to a sprocket wheel 45 on the shaft of the lower clutch roll 33, and thus all the rolls and the beater are suitably driven, but as above remarked, any operative driving mechanism may be employed. The beater and clutch rolls are preferably incased in a housing 45ª, as shown in Fig. 1.

From the incline or chute 37 the shredded leaves are delivered to a carrier 46 comprising chains 47 and connecting cross slats 48, this carrier being mounted at its lower end on sprocket wheels 49 which are carried by a shaft 50 on the frame 11 and the opposite end of the carrier is mounted on a drum 51 in the frame 52, which is practically an extension of the frame 11. The carrier extends along the upper part of the frame 52, being divided by the guide rolls or pulleys 53, and the upper surface of the carrier is, at this point, arranged to move over plates 54 and 55 which prevent the fiber from falling through. The open structure of the carrier, at a point between the two frames 11 and 52 causes the trash and short fiber to fall through the carrier and thus only clean fiber is carried to the frame 52 and is there discharged into a hopper 56, as shown best in Fig. 6. The drum 51 is driven by a sprocket wheel 57 and chain 58, see Fig. 8, but may be driven in any suitable way.

A plunger 59 slides across the bottom of the hopper 56 which is slotted to provide for the movement of the plunger and this plunger is preferably turned up at the bottom and at its free edge, as shown at 60, which edge may be serrated if desired, and this edge is adapted to be forced into a recess 61 on the opposite side of the hopper from that in which the plunger moves. The plunger, at each stroke, will therefore double a portion of the fiber in the hopper and deliver it into the recess 61 immediately beneath the edge of a vertically arranged plunger 62 which moves in guides 63 at the rear side of the hopper, and when the plunger 59 is drawn forward, the plunger 62 descends and again doubles the fiber, forcing it through the aperture 64 in the hopper bottom to the passageway 65, where it is caught by the rearwardly moving plunger 66 which comprises a series of prongs, see Fig.

7, a head 67 to receive the prongs and cross pieces 68 and 69, the rearward movement of this plunger 66 forcing the mass of doubled, and consequently crimped, fiber into the steam box 70 which is directly behind the passageway 65.

It will be seen that the folding and squeezing of the fiber by the plungers will have the effect of doubling or crimping it, and this effect is further obtained by squeezing it beneath an abutment plate 71 which is at the rear end of the passageway 65, this plate being adjustable up and down by means of hand screws 72 which turn in suitable supports 73. It will be seen that by turning the plate 71 down the fiber is squeezed hard before it can pass beneath it, but by raising the plate the fiber passes easier and thus the plate may be given the proper tension and the compactness of the mass of fiber may be perfectly regulated.

The plungers 59 and 62 are operated by means of bell cranks 74, see Figs. 6 and 8, which are arranged on opposite sides of the hopper and are fulcrumed at their elbows on the shaft 76, the lower arms of the bell cranks being pivoted to the plunger 59, while their upper arms are pivoted to the plunger 62. The bell cranks 74 are operated by means of connecting rods 77 which are arranged on opposite sides of the frame 52, and connect with cranks 78 on the transverse shaft 79 which is provided with a fly wheel 80 and is driven by means of a sprocket wheel 81 and a chain 82 extending from this sprocket wheel to a sprocket wheel 83 on the driving shaft 84 which is journaled in the frame 52 and has a suitable driving pulley 85. The shaft 79 also carries a pinion 86 which meshes with a gear wheel 87 on a countershaft 88, which is also journaled on the frame 52, and the countershaft has cranks 89 at opposite ends which drive connecting rods 90, these being pivoted to the long cross pieces 69 of the head 67 and thus the revolution of the shaft 88 reciprocates the forked plunger 66 and cross head 67.

The front end of the steam box 70, into which the mass of fiber is crowded, as above described, is surrounded by steam chambers 91 which have perforated walls 92 through which the steam may pass to the steam box, and the fiber is thus heated so that its sap cells burst and it is ready to be quickly and properly dried. The steam is admitted to the chambers 91 by means of branch pipes 93 connecting with a supply pipe 94 which is controlled by a suitable valve, and the rear and main portion of the steam box is encircled by chambers 95 to which the steam is also admitted, these chambers forming a jacket for the steam box which heats it thoroughly so that the kinks in the fiber are set before the fiber leaves the steam box. The several steam chambers around the steam box are provided with cross braces 96 to give them the necessary strength, and the whole steaming apparatus is supported on a suitable frame 97.

It will be understood from the foregoing description that the mass of fiber will be held in the steam box in a series of compact folds, and this mass forms a web which issues from the rear end of the steam box, see Fig. 9, and is delivered to an elevator 98 which will not be described in detail, as it is like the ordinary carrying belt, this elevator carrying somewhat faster than the fiber issues from the steam box, so that the said fiber will be partially unfolded, thus permitting it to be more quickly acted on by the heat in the drier 99 to which it is carried by the elevator. The elevator 98 enters the upper part of the drier 99 and extends horizontally, as shown at 100 in Fig. 11, the belt of the elevator extending over a suitable drum 101, and the elevator delivers upon a horizontally moving carrier 102 below it, and this upon another similar carrier, the whole series of these carriers being arranged one above another, so that each delivers upon the one next below it and the fiber is prevented from being thrown off the ends of the carriers by curved guards 103.

The carriers in the drier are all driven by a single chain belt 107, and to provide for this each carrier has, at one end, a pulley or wheel 108 over which the belt runs in a zigzag course, as shown in Fig. 11, and the belt also extends over a suitable idler to give it the necessary tension. The belt is itself driven from the shaft 104, which also carries the elevator 98 and is provided with a sprocket wheel 105 driven by a chain belt 106. The fiber is carried from carrier to carrier through the drier and is discharged from the lower end and back side at the point 110, from which point it may be carried to a continuous baler or to any desired place. The drier may be heated in any convenient manner, preferably by steam pipes arranged in a suitable way within it, and by means of an ordinary blower and heater 111 which delivers into the carrier through a pipe 112.

It will be seen from the foregoing description that nothing is necessary for the operator to do except to feed the crude leaves upon the table 10, after which the leaves are shredded, are crimped by means of the series of plungers described, and the fiber is properly steamed, is delivered to the drier in a continuous web, and is carried through the drier in such a way that, when it emerges, the kinks are perfectly set and the fiber when squeezed in bales is rendered still more kinky and the process is equivalent to twisting the fiber into a rope, as is done in the treatment of the African or Algerian variety.

Having thus described my invention, I claim as new and desire to secure by Letters Patent—

1. A machine of the kind described, comprising a shredding mechanism, a carrier to receive the fiber from the shredder, a series of plungers arranged to double and crimp the fiber as it is discharged from the carrier, a steam box to receive the fiber from the plungers, an elevator to receive the fiber from the steam box, and a drier to receive the fiber from the elevator, substantially as described.

2. A machine of the kind described, comprising a feed table having feeding belts thereon, crush rolls to receive the material from the belts, clutch rolls behind the crush rolls, a revoluble shredding beater behind the crush rolls, a carrier to receive the fiber from the beater, a series of plungers arranged to double and crimp the fiber as it is discharged from the carrier, a steam box to receive the fiber from the plungers, an elevator to catch the fiber as it comes from the steam box, and a drier to receive the fiber from the elevator, substantially as described.

3. In a machine of the kind described, the combination with the crush rolls and the shredding mechanism behind them, of the feed belts having carrying flanges thereon, and the spring-pressed guide plates arranged between the belts and rolls, substantially as described.

4. The combination, with the crush rolls and the shredding mechanism behind them, of the feed belts, the vertically arranged guides between the belts and rolls, and the depressible guide plates between the guides, substantially as described.

5. The combination, with the crush rolls and the shredding mechanism behind them, of the feed belts delivering to the rolls, the top plate covering the belt, and the depressible plates arranged at the rear end of the top plate, substantially as described.

6. The combination with the crush rolls, of the beating cylinder having projecting teeth thereon, the clutch rolls having their surfaces formed of elastic material for the purpose set forth, and the brake bar between the clutch rolls and the beating cylinder, substantially as described.

7. The combination of the clutch rolls, the brake bar, and the beating cylinder, the cylinder having projecting teeth arranged in double spiral lines thereon, substantially as described.

8. The combination, of the clutch rolls, the beating cylinder behind them, the brake bar between the clutch rolls and beating cylinder, and the incline beneath the cylinder having projecting teeth, substantially as described.

9. The combination, of the clutch rolls, the toothed beater, the brake bar between the clutch rolls and beater, and the teeth held stationary adjacent to the beater and below the brake bar, substantially as described.

10. The combination, with the shredding mechanism and the carrier, of the hopper arranged to receive the fiber from the carrier, and a pair of alternately reciprocating plungers arranged at angles to each other and adapted to double the fiber and force it through the hopper bottom, substantially as described.

11. The combination, with the hopper having side and bottom recesses of a folder plate reciprocating in the lower part of the hopper and a second folder plate traversing the path of the first plate, whereby fiber contained in the hopper is doubled and forced through the hopper bottom, substantially as described.

12. The combination with the hopper arranged to receive the fiber and having side and bottom recesses or apertures of the tilting bell cranks on opposite sides of the hopper, a horizontally reciprocating folder plate carried by the lower ends of the bell cranks and extending through the side apertures of the hopper, and a vertically reciprocating folder plate carried by the upper arms of the bell cranks, and adapted to project through the hopper bottom, substantially as described.

13. The combination, with the hopper, of the steam box adjacent thereto, means for forcing fiber through the hopper bottom, and a reciprocating plunger to force the fiber into the steam box, substantially as described.

14. The combination, with the hopper and the steam box, of the passageway beneath the hopper forming an extension of the steam box, means for forcing the fiber into the passageway, and a forked plunger reciprocating in the passageway, substantially as described.

15. The combination, with the hopper, the steam box and the plunger for forcing fiber from beneath the hopper into the steam box, of the adjustable abutment plate at the entrance to the steam box, substantially as described.

16. The combination, with the steam box and the plunger mechanism for forcing the fiber into it, of the steam jacket encircling the steam box, and steam inlets leading from the jacket to the box, substantially as described.

17. The combination, with the steam box, the crimping mechanism and means for discharging fiber from the steam box, of the drier comprising a series of carriers arranged to deliver one upon the other, and an elevator delivering from the steam box to the drier, substantially as described.

CHARLES A. GREEN.

Witnesses:
JOSEPH L. CUTLER,
DONALD GILLIS.